(12) United States Patent
O'Connor et al.

(10) Patent No.: US 12,280,444 B2
(45) Date of Patent: Apr. 22, 2025

(54) SIMULTANEOUS PATTERN-SCAN PLACEMENT DURING SAMPLE PROCESSING

(71) Applicant: Elemental Scientific Lasers, LLC, Omaha, NE (US)

(72) Inventors: Ciaran J. O'Connor, Bozeman, MT (US); Erik B. Larsen, Bozeman, MT (US); Leif C. Summerfield, Bozeman, MT (US)

(73) Assignee: Elemental Scientific Lasers, LLC, Omaha, NE (US)

( * ) Notice: Subject to any disclaimer, the term of this patent is extended or adjusted under 35 U.S.C. 154(b) by 0 days.

(21) Appl. No.: 18/525,021

(22) Filed: Nov. 30, 2023

(65) Prior Publication Data

US 2024/0207969 A1 Jun. 27, 2024

Related U.S. Application Data

(63) Continuation of application No. 15/437,804, filed as application No. PCT/US2017/012871 on Jan. 10, 2017, now Pat. No. 11,850,677.

(Continued)

(51) Int. Cl.
*B23K 26/03* (2006.01)
*B23K 26/0622* (2014.01)
(Continued)

(52) U.S. Cl.
CPC ........ *B23K 26/032* (2013.01); *B23K 26/0622* (2015.10); *B23K 26/082* (2015.10); *B23K 26/0861* (2013.01); *B23K 26/0876* (2013.01); *B23K 26/123* (2013.01); *B23K 26/127* (2013.01); *B23K 26/361* (2015.10); *B23K 26/362* (2013.01); *G01N 1/44* (2013.01); *G01N 21/718* (2013.01); *G01N 21/8806* (2013.01); *G06T 7/0004* (2013.01);
(Continued)

(58) Field of Classification Search
None
See application file for complete search history.

(56) References Cited

U.S. PATENT DOCUMENTS 8,199,321 B2 6/2012 Yoo et al.
8,319,176 B2 11/2012 Hutchinson et al.
(Continued)

FOREIGN PATENT DOCUMENTS

JP 2013528820 A 7/2013
JP 2013180342 A 9/2013
JP 2015504161 A 2/2015

OTHER PUBLICATIONS

Office Action from Korean Application No. 10-2018-7019877, dated Jun. 17, 2024.
(Continued)

*Primary Examiner* — Steven W Crabb
*Assistant Examiner* — Kuangyue Chen
(74) *Attorney, Agent, or Firm* — Kevin E. West; Advent, LLP

(57) ABSTRACT

A laser ablation system, and method, facilitates the execution of user-defined scans (i.e., in which a laser beam is scanned across a sample along a beam trajectory to ablate or dissociate a portion of the sample) and enables the user define additional scans while a scan is being executed.

14 Claims, 2 Drawing Sheets

Related U.S. Application Data

(60) Provisional application No. 62/277,349, filed on Jan. 11, 2016.

(51) Int. Cl.
```
B23K 26/08      (2014.01)
B23K 26/082     (2014.01)
B23K 26/12      (2014.01)
B23K 26/361     (2014.01)
B23K 26/362     (2014.01)
B23K 26/402     (2014.01)
G01N 1/14       (2006.01)
G01N 1/44       (2006.01)
G01N 21/71      (2006.01)
G01N 21/88      (2006.01)
G02B 21/00      (2006.01)
G02B 26/10      (2006.01)
G06T 7/00       (2017.01)
H01J 49/04      (2006.01)
B23K 103/00     (2006.01)
```

(52) U.S. Cl.
CPC ........ *B23K 26/402* (2013.01); *B23K 2103/30* (2018.08); *B23K 2103/50* (2018.08); *G02B 21/0016* (2013.01); *G02B 26/105* (2013.01); *G06T 2207/10056* (2013.01); *G06T 2207/20021* (2013.01); *G06T 2207/20104* (2013.01); *H01J 49/04* (2013.01)

(56) References Cited

U.S. PATENT DOCUMENTS

| | | | |
|---|---|---|---|
| 8,598,488 B2 | 12/2013 | O'Connor et al. | |
| 8,664,589 B2 | 3/2014 | Clem et al. | |
| 8,879,064 B2 | 11/2014 | O'Connor et al. | |
| 9,079,268 B2 * | 7/2015 | Fry | G02B 5/0891 |
| 9,492,887 B2 | 11/2016 | Summerfield et al. | |
| 2007/0141719 A1 | 6/2007 | Bui | |
| 2008/0089846 A1 | 4/2008 | Driehuys et al. | |
| 2010/0324832 A1 | 12/2010 | Levesque et al. | |
| 2011/0167374 A1 | 7/2011 | Yoneda | |
| 2011/0242307 A1 | 10/2011 | Summerfield et al. | |
| 2013/0168545 A1 | 7/2013 | Clem et al. | |
| 2013/0277340 A1 | 10/2013 | Liu et al. | |
| 2014/0223991 A1 | 8/2014 | Hilliard et al. | |
| 2014/0227776 A1 | 8/2014 | Sharp et al. | |
| 2014/0268134 A1 | 9/2014 | O'Connor | |
| 2015/0001196 A1 | 1/2015 | Kim et al. | |
| 2015/0165550 A1 | 6/2015 | Fry et al. | |
| 2015/0190884 A1 | 7/2015 | Roy et al. | |
| 2015/0265220 A1 | 9/2015 | Ernst et al. | |
| 2018/0236608 A1 * | 8/2018 | Okuma | B23K 26/06 |

OTHER PUBLICATIONS

Carberry D. M. et al, 'Mapping real-time images of high speed AFM using multitouch control' Nanotechnology, 2009, vol. 20, 434018. https://doi.org/10.1088/0957-4484/20/43/434018.

Third Office Action for Chinese Application No. 201780012436.4, dated Nov. 1, 2021.

Decision of Rejection in China for Application No. 201780012436.4, dated Mar. 31, 2022.

Decision to Grant Patent for Japanese Patent Application No. 2018-536243, dated Oct. 6, 2020.

Examination Report in Australia for Application No. 2022200425, dated Dec. 16, 2022.

Examination report No. 1 in Australia for Patent Application No. 2017207276, dated Jan. 22, 2021.

Examination report No. 1 in Australia for Patent Application No. 2022200425, dated Dec. 16, 2022.

Examination report No. 2 in Australia for Patent Application No. 2017207276, dated Aug. 20, 2021.

Examination report No. 3 in Australia for Patent Application No. 2017207276, dated Jan. 13, 2022.

International Search Report and Written Opinion for PCT/US2017/012871, dated Mar. 31, 2017.

Office Action for Chinese Application No. 201780012436.4, dated May 22, 2020.

Office Action from Korean Application No. 10-2018-7019877, dated Dec. 6, 2023.

Second Office Action for Chinese Application No. 201780012436.4, dated Feb. 1, 2021.

Supplemental European Search Report for European Application No. 17738804.8, dated Jul. 24, 2019.

Chinese Office Action for Application No. 201780012436.4, dated Dec. 12, 2024.

* cited by examiner

SIMULTANEOUS PATTERN-SCAN PLACEMENT DURING SAMPLE PROCESSING

CROSS-REFERENCE TO RELATED APPLICATIONS

This application is a continuation under 35 U.S.C. § 120 of U.S. patent application Ser. No. 15/437,804, filed Feb. 21, 2017, which in turn is a national stage application under 35 U.S.C. § 371, which in turn claims the benefit of U.S. Provisional Application No. 62/277,349, filed Jan. 11, 2016, each of which is incorporated by reference in its entirety.

BACKGROUND

I. Technical Field

Embodiments described herein relate generally to laser ablation systems, such as those used to support sampling and compositional analysis. More specifically, embodiments described herein relate generally to laser ablation systems and methods that enable efficient creations of scans to be performed while a scanning operation is being executed.

II. Discussion of the Related Art

Analysis systems, such as mass spectrometry (MS) systems, optical emission spectrometry (OES) systems and the like, can be used to analyze the composition of a sample (e.g., a solid or liquid material). Often, a portion of the sample is provided to an analysis system in the form of an aerosol (i.e., a suspension of solid and possibly liquid particles and/or vapor in a carrier gas, such as helium gas, argon gas, etc.). The aerosol is typically produced by arranging the sample within a laser ablation chamber, introducing a flow of a carrier gas within the chamber, and ablating a portion of the target with one or more laser pulses to generate a plume containing particles and/or vapor ejected or otherwise generated from the sample (hereinafter referred to as "sample material"), suspended within the carrier gas. Entrained within the flowing carrier gas, the sample material is transported to an analysis system via a transport conduit to, for example, an ICP torch, where it is ionized. A plasma containing the ionized particles and/or vapor is then analyzed by an analysis system such as an MS or OES system. Conventionally, laser ablation systems used to generate plumes, such as those described above, permit a user to define or otherwise select a beam trajectory (e.g., a path extending along any combination of the X-, and Y-axes) along which a laser beam is to be scanned on the sample. After the beam trajectory is defined or selected, portions of the sample disposed in the beam trajectory are ablated by moving the sample so as to translate a spot illuminated by the laser beam to along the beam trajectory.

SUMMARY

One embodiment exemplarily described herein can be characterized as a method for use with a laser ablation system having a sample chamber accommodating a sample within an interior thereof, a laser configured to generate a laser beam having parameters suitable for ablating or otherwise dissociating a portion of the sample within the sample chamber, and at least one scanning component configured to impart relative movement between the sample and the laser beam. The method can include processing image data to generate location data. The image data can be representative of obtained imagery of the sample, and the location data can associate at least one location within the obtained imagery with at least one corresponding spatial location within the interior of the sample chamber. An operation of at least one selected from the group consisting of the laser and the at least one scanning component can be controlled to execute a first scan in a first region-of-interest of the sample where the sample is to be ablated or otherwise dissociated by the laser beam. While the first scan is being executed, scan data defining a second scan to be executed in a second region-of-interest of the sample can be generated and stored.

Another embodiment exemplarily described herein can be characterized as a laser ablation system that includes a sample chamber having an interior within which a sample can be accommodated, a laser configured to generate a laser beam, at least one scanning component configured to impart relative movement between the sample and the laser beam, a user interface configured to display imagery of the sample and enable a user to indicate (based on the displayed imagery) a first region-of-interest of the of the sample where the sample is to be ablated or otherwise dissociated by the laser beam, a processor configured to execute instructions to control an operation of at least one of the laser and the at least one scanning component to execute a first scan in the first region-of-interest of the sample and (while executing the first scan) enable a user to indicate (based on the displayed imagery) a second region-of-interest of the of the sample where the sample is to be ablated or otherwise dissociated by the laser beam, and memory communicatively coupled to the processor and configured to store the instructions.

DETAILED DESCRIPTION

Figure 1:
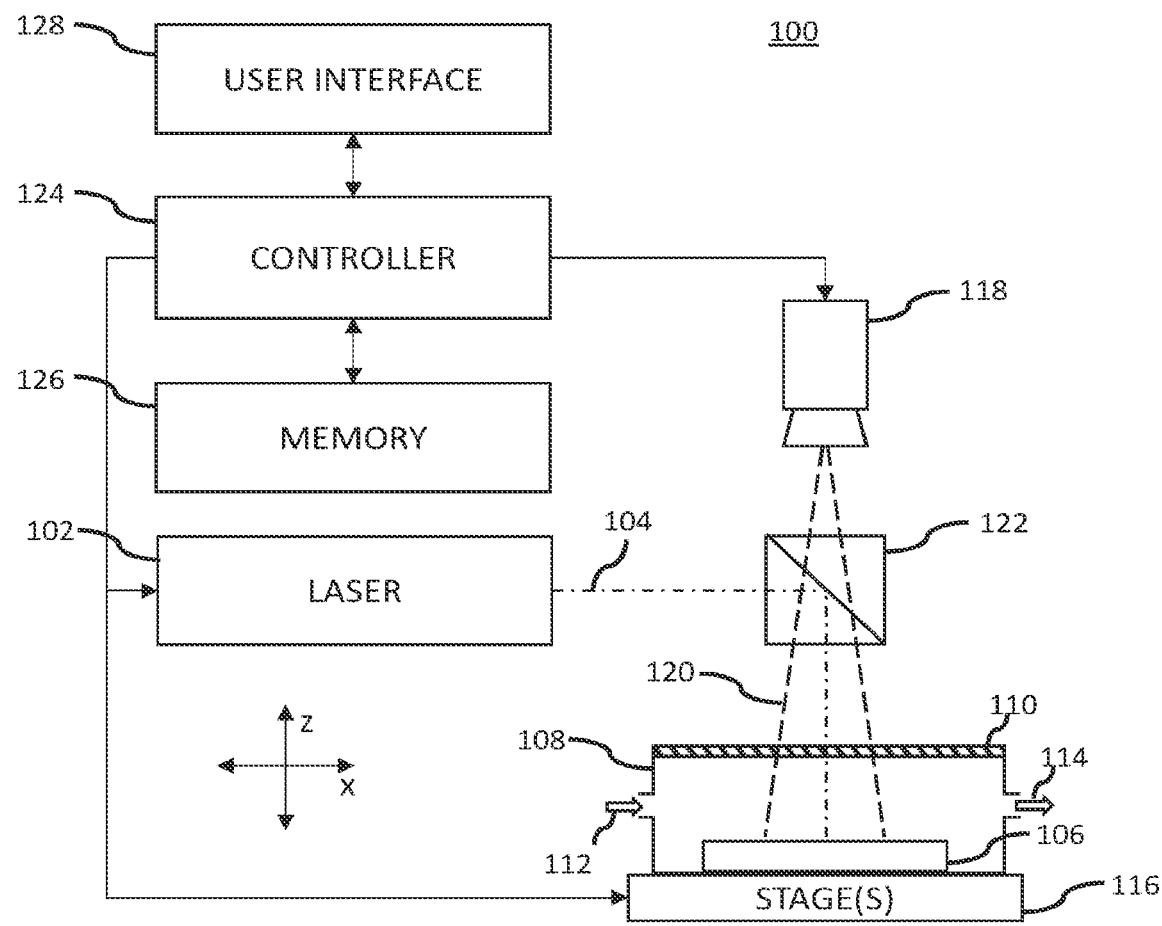
FIG. 1 schematically illustrates a laser ablation system according to one embodiment.

Example embodiments are described herein with reference to the accompanying drawings. Unless otherwise expressly stated, in the drawings the sizes, positions, etc., of components, features, elements, etc., as well as any distances therebetween, are not necessarily to scale, but are exaggerated for clarity. In the drawings, like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

The terminology used herein is for the purpose of describing particular example embodiments only and is not intended to be limiting. Unless otherwise defined, all terms (including technical and scientific terms) used herein have the same meaning as commonly understood by one of ordinary skill in the art. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one node could be termed a "first node" and similarly, another node could be termed a "second node", or vice versa.

Unless indicated otherwise, the term "about," "thereabout," etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Spatially relative terms, such as "below," "beneath," "lower," "above," and "upper," and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

FIG. 1 schematically illustrates a laser ablation system according to one embodiment.

Referring to FIG. 1, a laser ablation system, such as laser ablation system 100, includes a laser 102 operative to produce a laser beam, which may be propagated along a beam path 104 to a sample 106 within a sample chamber 108. Although not shown, the laser ablation system may optionally include optics disposed along the beam path 104, such as focusing optics (e.g., lenses), beam steering optics (e.g., fast steering mirrors, mirror galvanometer deflectors, electro-optic deflectors, and/or acousto-optic deflectors), or the like or any combination thereof.

Examples of materials that can be provided as the sample 106 include, for example, archaeological materials, biological assay substrates and other biological materials, ceramics, rock or other geological materials, pharmaceutical agents (e.g., pills), metals, polymers, petrochemical materials, liquids, semiconductors, paint, varnish, glass, paper, textiles, etc. The laser beam may include a plurality of laser pulses, which may be characterized by a parameters such as pulse repetition frequency, wavelength, pulse energy, etc., selected so as to ablate or otherwise dissociate material from the sample 106. Artisans will recognize from the disclosure herein that, in other embodiments, a continuous wave (CW) or quasi-continuous wave (QCW) laser beam may be used.

Generally, the sample chamber 108 is provided as a (preferably) airtight vessel, within which sample 106 can be inserted, accommodated and removed. The sample chamber 108 can include a transmission window 110 (e.g., formed of a material such as glass, sapphire, or other material that is suitably transparent to the laser beam). The sample chamber 108 typically includes one or more inlets to introduce purge gas, carrier gas, or the like, into the interior of the sample chamber 108 (as indicated by arrow 112) and one or more outlets though which purge gas, carrier gas, or transport an aerosol containing material ablated or otherwise dissociated from the sample 106 out of the sample chamber 108 (e.g., as indicated by arrow 114). Although not illustrated, the sample chamber 108 may be provided with a sample transport conduit to transport the aerosol from the interior of the sample chamber 108, through an outlet, to a sample preparation system (also not shown) such as a plasma torch (e.g., an ICP torch), or the like, that is coupled to an input of an analysis system (e.g., a mass spectrometer, an optical emission spectrometry system, or the like). Examples of sample chambers (also known by persons of ordinary skill in the art as "sample cells" or "ablation cells") that may be used in conjunction with embodiments discussed herein include the TWOVOL2 and TRUELINE ablation cells, offered by ELECTRO SCIENTIFIC INDUSTIRIES, INC.; the HELEX II ACTIVE 2-VOLUME ABLATION CELL, offered by TELEDYNE CETAC TECHNOLOGIES, INC. Other examples of sample chambers, sample transport conduits, inlets, outlets, and the like, that may be used in conjunction with the embodiments discussed herein can be found in U.S. Pat. Nos. 8,319,176, 8,598,488, 8,664,589 and 8,879,064, and U.S. Patent App. Pub. Nos. 2011/0242307, 2014/0223991, 2014/0227776, 2014/0268134, each of which is incorporated herein by reference in its entirety.

In one embodiment, the sample chamber 108 is mounted on one or more motion stages 116, which are operative to move the sample chamber 108 (and, thus, the sample 106) relative to the beam path 104. In another embodiment, one or more motion stages 116 are arranged inside the sample chamber 108, in which case the sample 106 may be supported on (and moved by the motion stage(s) 116 relative to the beam path 104), or on a chuck or other fixture (not shown) carried by a motion stage 116. The motion stage(s) 116 may be configured to linearly translate the sample chamber 108 (e.g., along an X-, Y- or Z-axis, or any combination thereof) in to rotate the sample chamber (e.g., along the X-, Y- or Z-axis, or any combination thereof). In FIG. 1, the X- and Z-axes are shown to be orthogonal to one another. The Y-axis (not illustrated) is orthogonal to the X- and Z-axes.

In another embodiment, the one or more motion stages 116 may be omitted. In this case, laser ablation system may include beam steering optics (e.g., one or more fast steering mirrors, mirror galvanometer deflectors, electro-optic deflectors, acousto-optic deflectors, or the like or any combination thereof) as discussed above, to enable movement of the beam path 104 relative to the sample 106. In yet another embodiment, the one or more motion stages 116 may be included (either inside or outside the sample chamber 108), and relative movement between the beam path 104 and the sample 106 may be effected by operating the one or more motion stages 116 and the beam steering optics in a synchronized or otherwise coordinated manner.

The laser ablation system 100 may further include an optical microscope system 118 that is in optical communication with the interior of the sample chamber 108 (e.g., via the transmission window 110). The optical microscope system 118 may include one or more cameras (e.g., including one or more image sensors such a CCD sensor, a CMOS sensor, or the like or any combination thereof) and may capture imagery (e.g., in the form of still images, video, or a combination thereof) of the interior of the sample chamber 108. In one embodiment, the optical microscope system 118 includes multiple cameras, each with one or more different characteristics (e.g., resolution, field-of-view, spectral sensitivity, or the like or any combination thereof). When a sample 106 is accommodated within the sample chamber 108, the sample 106 is arranged within the field-of-view 120 of a camera of the optical microscope system 118. The laser ablation system 100 may further include optics 122 (e.g., beam splitter, a beam combiner, a half-silvered mirror, or the like or any combination thereof) to combine the optical axes of the laser beam with a field-of-view 120 of optical microscope system 118.

In the illustrated embodiment, the laser ablation system 100 further includes a controller 124, a memory device 126 and a user interface 128. The controller 124 is configured to control operations of the laser 102, the motion stage(s) 116 (if included), any beam steering optics (if included), the optical microscope system 118, and the user interface 128. The controller 124 may also be used, in certain embodiments, to control supplemental devices such as the sample preparation system, the analysis system, or the like or any combination thereof. An artisan will understand from the disclosure herein that more than one controller 124 may also be used.

Generally, the controller 124 includes one or more processors configured to control operations of one or more of the aforementioned components of the laser ablation system 100, the supplemental devices, or the like or any combination thereof, upon executing instructions. A processor can be provided as a programmable processor (e.g., including one or more general purpose computer processors, microprocessors, digital signal processors, or the like or any combination thereof) configured to execute the instructions. Instructions executable by the processor(s) may be implemented as software, firmware, etc., or in any suitable form of circuitry including programmable logic devices (PLDs), field-programmable gate arrays (FPGAs), field-programmable object arrays (FPOAs), application-specific integrated circuits (ASICs)—including digital, analog and mixed analog/digital circuitry—or the like, or any combination thereof. Generally, instructions implemented software (e.g., executable code, files, instructions, etc., library files, etc.) may be written in computer programming languages such as C, C++, Visual Basic, Java, Python, Tel, Perl, Scheme, Ruby, etc. Execution of instructions can be performed on one processor, distributed among processors, made parallel across processors within a device or across a network of devices, or the like or any combination thereof.

The memory device 126 includes tangible media such as computer memory on which computer-executable instructions can be stored, to be read (e.g., via one or more wired or wireless communications links) and executed by the controller 124 to cause the laser ablation system 100 to function as described herein. The memory device 126 may also store image data representative of imagery captured by the optical microscope system 118 (or otherwise obtained from some other image capture system not associated with the laser ablation system), location data for associating the portions of the captured imagery with corresponding spatial locations within the field-of-view 120, and other data associated with the processes described herein (e.g., scan positions, age and/or origin of the sample 106, report files, sample chamber parameters, laser parameters, and other experiment or ablation parameters). Although illustrated as a separate component from the controller 124, the memory device 126 may be provided as an integral component of the controller 124. Moreover, although FIG. 1 illustrates only a single memory device 126, it will be appreciated that multiple memory devices 126 may be provided. As used herein, "computer memory" includes magnetic media (e.g., magnetic tape, hard disk drive, etc.), optical discs, volatile or non-volatile semiconductor memory (e.g., RAM, ROM, NAND-type flash memory, NOR-type flash memory, SONOS memory, etc.), etc., and may be accessed locally, remotely (e.g., across a network), or the like or any combination thereof.

The user interface 128 may include one or more input devices (e.g., a computer keyboard, a computer mouse, a trackpad, a stylus, a button, a touchscreen, a microphone, etc.) one or more output devices (e.g., a computer monitor, a printer, a haptic actuator, a speaker, etc.) or the like or any combination thereof. The user interface 128 may also include a graphical user interface (GUI) displayable by a computer monitor a touchscreen, etc., which includes one or more windows, drop-down menus, buttons, scroll bars, icons, etc., that the user may interact with (e.g., via one or more input devices).

Generally, the user interface 128 enables a user to select a particular region of the sample 106 to ablate or otherwise dissociate for analysis (e.g., at an analysis system) and enable a user to define or otherwise select a beam trajectory (e.g., a path extending along any combination of the X-, Y- and Z-axes) along which the laser beam is to be scanned on the sample 106. The user may define one more single spots, a line of distinct spots, a grid of distinct spots, a line of continuous ablation (e.g., overlapping laser spots creating a continuous kerf), and/or a raster pattern covering a two-dimensional (2D) area of the sample 106. In certain embodiments, multiple passes of the laser beam along the same spot, line, or raster pattern may be used to cut deeper into the sample so as to generate three-dimensional (3D) spectroscopy data. Accordingly, a beam trajectory can be characterized by one or more parameters such as start location, end location, number of spots, pitch between adjacent spots, overlap of adjacent spots, line shape, line length, or the like or any combination thereof. As used herein, a beam trajectory along which the laser beam is scanned can also be characterized as a "scan," and the act of ablating or otherwise dissociating a region of the sample 106 along a beam trajectory can also be characterized as "scanning" the laser beam or "executing" a scan. Data corresponding to the beam trajectory defined or otherwise selected by the user via the user interface 128 (i.e., "scan data") may be generated stored, e.g., as computer-executable instructions executable by the controller 124, at the memory device 126.

The sample 106 will either be heterogeneous or homogeneous in composition, and a user may thus desire to analyze the composition of the sample 106 at multiple regions thereof. To facilitate the efficient compositional analysis from multiple regions of the sample 106, embodiments of the present invention enable a user to specify one or more parameters of one or more scans to be performed (also referred to as "configuring a scan") while another scan is being performed. An exemplary method for facilitating the simultaneous specification of parameters of a scan with the execution of a scan will be described in greater detail below with respect to FIGS. 1 and 2.

Figure 2:
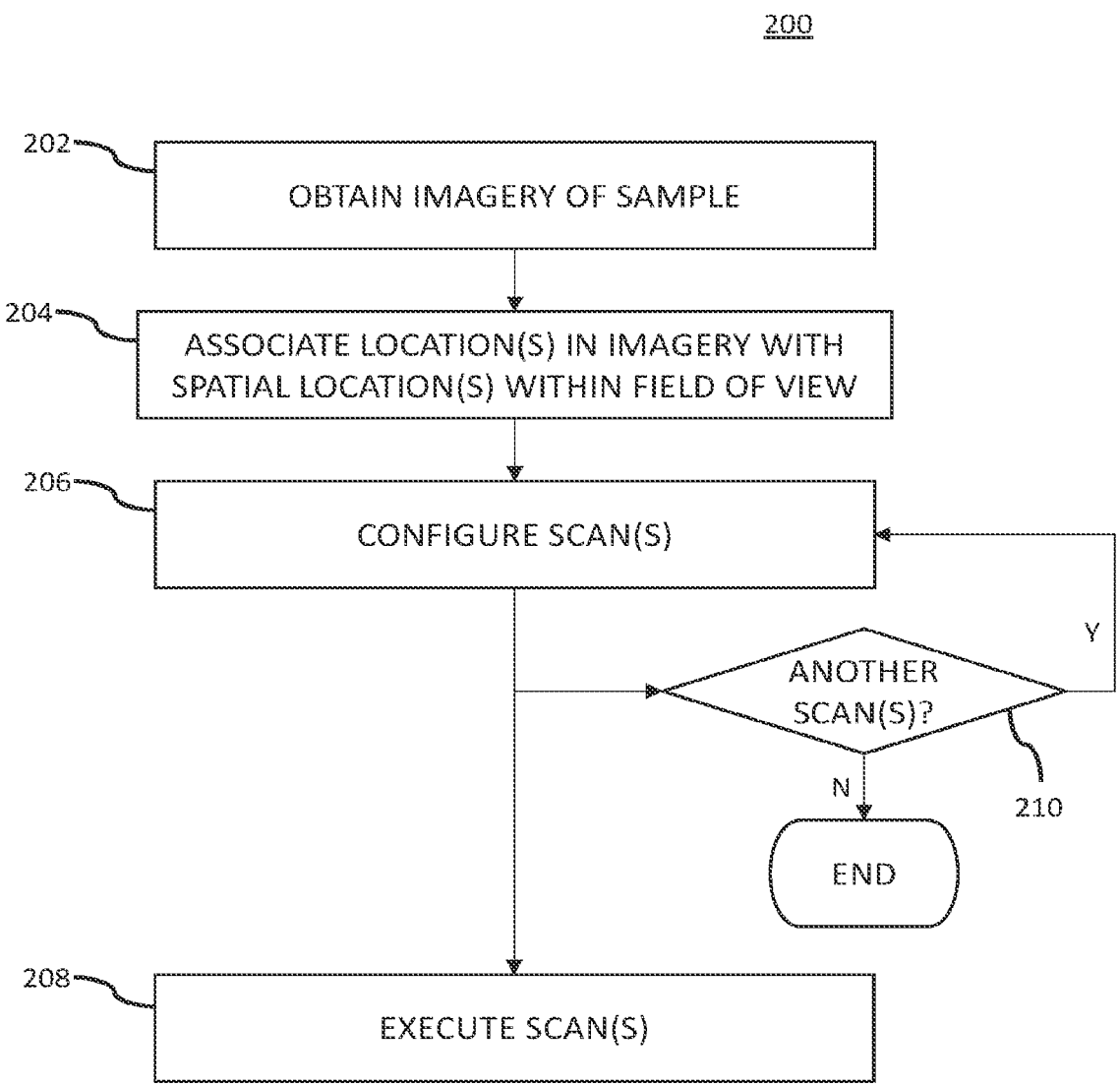
FIG. 2 illustrates a flow chart describing one embodiment of a method for facilitating the simultaneous specification of parameters of a scan with the execution of a scan.

Referring to FIG. 2, a method for facilitating the simultaneous specification of parameters of a scan with the execution of a scan, such as method 200, can include obtaining imagery of a sample 106. See, e.g., act 202 in FIG. 2. In one embodiment, the imagery obtained at 202 can be captured (e.g., as image data) by the optical microscope system 118 (e.g., after the sample 106 has been placed within the interior of the sample chamber 108). In another embodiment, the imagery obtained at 202 can be imported (e.g., as image data) from one or more other systems (e.g., one or more optical microscope systems not included as part of the laser ablation system 100) before the sample 106 has been placed within the sample chamber 108, after the sample 106 has been placed within the sample chamber 108, or the like or any combination thereof. In such an embodiment, the imported image data can be stored at the memory device 126. Image data can be imported into the laser ablation system 100 (e.g., stored at the memory device 126) via any suitable wired or wireless communications link (e.g., USB device, Ethernet, WiFi, Bluetooth, etc.).

At 204, image data representative of the imagery obtained at 202 (e.g., imagery captured by the optical microscope system 118) may be processed (e.g., at the controller 124) to generate location data, which associates locations in the obtained imagery with spatial locations within the field-of-view 120. In one embodiment, imagery obtained at 202 by importing image data may be accompanied with metadata (e.g., location data) that associates one or more locations in the imported imagery with one or more corresponding spatial locations within the field-of-view 120. In another embodiment, metadata (e.g., location data) associating locations in the imported imagery with spatial locations within the field-of-view 120 may be generated by the user, by the controller 124 or a combination thereof. For example, the one or more features represented in the imported imagery (e.g., an edge of a sample, a pit in the sample, a region having a particular coloration, a pre-generated fiducial or other alignment feature on the sample 106, or the like or any combination thereof), may be aligned to one or more corresponding features in imagery captured by the optical microscope system 118. Such alignment may be performed by the controller 124, by the user (e.g., by displaying the imported imagery and the imagery captured by the optical microscope system 118 in an overlaid manner, and enabling the user to indicate which features(s) in the imported imagery corresponds to which feature(s) in the imagery captured by the optical microscope system 118), or the like or any combination thereof. In addition, the image data may be stored, in association with the location data, at the memory device 126.

At 206, the user is permitted to configure one or more scans (e.g., via the user interface 128). For example, the stored image data may be processed (e.g., by the controller 124) to display the imagery obtained at 202 on a computer monitor of the user interface 128 and the user may indicate, within the sample 106, the location of a region-of-interest by selecting a region of the displayed imagery (e.g., by moving a cursor on the computer monitor using a mouse, by touching a touchscreen component of the computer monitor, etc.) where any scan is to be started, stopped, or otherwise executed. The controller 124 can process the user input to identify location data corresponding to the selected region.

At 208, the controller 124 can control an operation of the laser 102, the motion stage(s) 116 and/or any beam steering optics (e.g., by outputting one or more control signals to the aforementioned components), to execute any scan previously configured at 206. For example, the controller 124 may control an operation of the motion stage(s) 116 to align the aforementioned region-of-interest in the sample 106 to the beam path 104 so that the laser beam can ablate or otherwise dissociate the sample 106 at the previously-identified region-of-interest. In one embodiment, a scan is executed in response to a specific user input (e.g., provided via the user interface 128).

Simultaneously with the execution of a scan at 208, the user is permitted to configure one or more additional scans (e.g., if one or more other scans are desired to be configured at, for example, one or more different regions-of-interest) as indicated at 210. Each newly configured scan can be executed (e.g., in sequential fashion) in response to specific user input (e.g., provided via the user interface 128) or can be automatically executed (i.e., without requiring the user to provide additional user input). However, if a previously-configured scan is already being executed, then the controller 124 can place the newly-configured scan in a queue until the execution of the previously-configured scan is complete. After a previously-configured scan has been executed, the controller 124 can automatically execute a newly-configured scan (i.e., without requiring the user to provide additional user input).

The foregoing is illustrative of embodiments and examples of the invention, and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention. Accordingly, all such modifications are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present invention should, therefore, be determined by the following claims, with equivalents of the claims to be included therein.

What is claimed is:

1. A method for use with a laser ablation system having a sample chamber accommodating a sample within an interior thereof, a laser configured to generate a laser beam having parameters suitable for ablating or otherwise dissociating a portion of the sample within the sample chamber, and at least one scanning component configured to impart relative movement between the sample and the laser beam, the method comprising:
   processing image data, representative of obtained imagery of the sample, to generate location data, the location data associating at least one location within the obtained imagery with at least one corresponding spatial location within the interior of the sample chamber;
   controlling an operation of at least one selected from the group consisting of the laser and the at least one scanning component to execute a first scan in a first region-of-interest of the sample where the sample is to be ablated or otherwise dissociated by the laser beam; and
   while controlling an operation of at least one of the laser and a motion stage to execute the first scan, generating and storing scan data defining a second scan to be executed in a second region-of-interest of the sample where the sample is to be ablated or otherwise dissociated by the laser beam.

2. The method of claim 1, prior to controlling the operation of at least one of the laser and the at least one scanning component to execute the first scan, generating and storing scan data defining the first scan.

3. The method of claim 1, further comprising generating and storing scan data defining the first scan in response receiving user input obtained through a user interface.

4. The method of claim 1, after executing the first scan, controlling an operation of at least one of the laser and the at least one scanning component to execute the second scan based on the stored scan data defining the second scan.

5. The method of claim 1, further comprising generating and storing scan data defining the second scan in response receiving user input obtained through a user interface.

6. The method of claim 1, further comprising obtaining the imagery by capturing the imagery using an optical microscope system having a field-of-view encompassing at least a portion of a region of the interior of the sample chamber where the sample is accommodated.

7. The method of claim 6, wherein the field-of-view encompasses the entire region of the interior of the sample chamber where the sample is accommodated.

8. The method of claim 1, wherein receiving the image data includes importing image data representative of imagery captured by an image capture system not included as part of the laser ablation system.

9. The method of claim 1, wherein the laser ablation system further includes an optical microscope system having a field-of-view encompassing at least a portion of a region of the interior of the sample chamber where the sample is accommodated, and wherein the location data associates at least one location within the obtained imagery with at least one corresponding spatial location within the field-of-view.

10. The method of claim 1, wherein controlling the operation of the at least one scanning component includes controlling an operation of the motion stage configured to move the sample relative to a beam trajectory along which the laser beam can impinge upon the sample.

11. The method of claim 1, wherein controlling the operation of the at least one scanning component includes controlling an operation of a beam steering optical component configured to move the laser beam relative to a beam trajectory along which the laser beam can impinge upon the sample.

12. The method of claim 11, wherein the beam steering optical component includes at least one mirror galvanometer deflector.

13. The method of claim 1, wherein controlling the operation of at least one of the laser and the at least one scanning component to execute the first scan in the first region-of-interest of the sample includes controlling the operation of at least one of the laser and the at least one scanning component to execute a first set of scans in a first set of regions-of-interest of the sample where the sample is to be ablated or otherwise dissociated by the laser beam.

14. The method of claim 1, wherein generating and storing scan data defining the second scan to be executed in a second region-of-interest of the sample includes generating and storing scan data defining a second set of scans to be executed in a second set of regions-of-interest of the sample where the sample is to be ablated or otherwise dissociated by the laser beam.

* * * * *